US006470043B1

United States Patent
Lo et al.

(10) Patent No.: US 6,470,043 B1
(45) Date of Patent: *Oct. 22, 2002

(54) NEAR-OPTIMAL LOW-COMPLEXITY DECODING OF SPACE-TIME CODES FOR FIXED WIRELESS APPLICATIONS

(75) Inventors: Titus Lo, Redmond, WA (US); Vahid Tarokh, Madison, NJ (US)

(73) Assignee: AT&T Wireless Services, Inc., Redmond, WA (US)

( * ) Notice: Subject to any disclaimer, the term of this patent is extended or adjusted under 35 U.S.C. 154(b) by 42 days.

This patent is subject to a terminal disclaimer.

(21) Appl. No.: 09/690,542

(22) Filed: Oct. 17, 2000

Related U.S. Application Data

(63) Continuation of application No. 09/063,765, filed on Apr. 21, 1998, now Pat. No. 6,188,736.
(60) Provisional application No. 60/068,613, filed on Dec. 23, 1997.

(51) Int. Cl.[7] .............................................. H04B 1/707
(52) U.S. Cl. ........................ 375/144; 375/148; 375/347
(58) Field of Search .................................. 375/144, 148, 375/267, 299, 347, 147

(56) References Cited

U.S. PATENT DOCUMENTS

| | | | |
|---|---|---|---|
| 3,633,107 A | 1/1972 | Brady | |
| 4,577,332 A | 3/1986 | Brenig | |
| 4,675,880 A | 6/1987 | Davarian | |
| 4,733,402 A | 3/1988 | Monsen | |
| 4,953,183 A | 8/1990 | Bargmans et al. | |
| 5,202,903 A | * 4/1993 | Okanoue | 375/341 |
| 5,481,572 A | 1/1996 | Skold et al. | |
| 5,553,102 A | * 9/1996 | Jasper et al. | 375/347 |
| 5,943,372 A | * 8/1999 | Gans et al. | 370/208 |
| 5,949,833 A | * 9/1999 | Weerackody | 375/141 |
| 5,960,039 A | * 9/1999 | Martin et al. | 375/267 |
| 5,991,331 A | 11/1999 | Chennankeshu et al. | |
| 6,034,987 A | 3/2000 | Chennankechu et al. | |
| 6,115,427 A | 9/2000 | Calderbank et al. | |
| 6,188,736 B1 | * 2/2001 | Lo et al. | 375/130 |

FOREIGN PATENT DOCUMENTS

| | | |
|---|---|---|
| GB | 2 280 575 A | 2/1995 |
| GB | 2 290 010 A | 12/1995 |
| GB | 2 311 445 A | 9/1997 |
| WO | WO95/22214 A1 | 8/1995 |

OTHER PUBLICATIONS

M.A. Blanco & K. Zdunek; "On the Optimization of Simple Switched Diversity Receivers," 1978 IEEE Conference on Communications and Power, Montreal, Canada, pp. 114–117, (1978).

M.A. Blanco & K. Zdunek, "Performance and Optimization of Switched Diversity Systems for the Detection of Signals with Rayleigh Fading," *IEEE Transactions on Communications*, 27(12):1887–1895, (Dec. 1979).

(List continued on next page.)

*Primary Examiner*—Don N. Vo
(74) *Attorney, Agent, or Firm*—Perkins Coie LLP

(57) ABSTRACT

An improved multi-antenna receiver is realized for detecting signals transmitted by a multi-antenna transmitter by summing signals received at the plurality of receiver antennas after multiplying each by a respective constant. The summed signal is applied to a maximum likelihood detector. The respective constants, $\lambda_j$, where j is an index designating a particular receiver antenna, are determined by evaluating the largest eigenvector of the matrix A, where $\Lambda$ is a vector containing the values $\lambda_j$, and A is a matrix containing elements $\alpha_{ij}$, which is the transfer function between the $i^{th}$ transmitter antenna to the $j^{th}$ receiver antenna. The $\alpha_{ij}$ terms are determined in the receiver in conventional ways.

4 Claims, 2 Drawing Sheets

OTHER PUBLICATIONS

G.J. Foschini, "Layered Space–Time Architecture for Wireless Communication in a Fading Environment when Using Multi–Element Antennae", *Bell Technical Labs Journal*, pp. 41–59, (1996).

G.J. Foschini and M.J. Gans, "On Limits of Wireless Communications in a Fading Environment when Using Multiple Antennas," *Wireless Personal Commmunications* 6:311–335, (1998).

J. Hinderling, et al., "CDMA Mobile Station Modem ASIC," *IEEE 1992 Custom Integrated Circuits Conference* pp. 10.2.1–10.2.5, (1992).

R. Kerr, et al., "The CDMA Digital Cellular System: An ASIC Overview," *IEEE 1992 Custom Integrated Circuits Conference* pp. 10.1.1–10.1.7, (1992).

R.L. Pikhotz, et al., "Theory of Spread Spectrum Communications—A Tutorial," *IEEE Transactions on Communications*, 30(5):857–884, (1992).

N. Seshadri and J.H. Winters, "Two Signaling Schemes for improving the Error Performance of Frequency Division Duplex Transmission Using Transmitter Antenna Diversity," *International Journal of Wireless Information Networks*, 1(1):49–60, (1994).

V. Tarokh, et al., "Space–Time Codes for High Data Rate Wireless Communication: Performance Criteria and Code Construction", *IEEE Trans Info Theory* vol. 44, (Mar. 1998).

V. Tarokh, et al., "Space Time Codes for High Data Rate Wireless Communication: Performance Criteria in the Presence of Channel Estimation Errors, Mobility, and Multiple Paths", *IEEE Transactions on Communications* 47(2):199–207, (1999).

J. Winters, "The Diversity Gain of Transmit Diversity in Wireless System with Rayleigh Fading", *AT&T Bell Laboratories New Orleans Supercomm ICC* pp. 1121–1125, (May 1994).

A. Wittneben, "A New Bandwidth Efficient Transmit Antenna Modulation Diversity Scheme for Linear Digital Modulation," *Proc. IEEE ICC* pp. 1630–1634, (1993).

A. Wittneben, "BaseStation Modulation Diversity for Digital Simulcast," *Proc. IEEE VTC*, pp. 848–853, (May 1991).

\* cited by examiner

NEAR-OPTIMAL LOW-COMPLEXITY DECODING OF SPACE-TIME CODES FOR FIXED WIRELESS APPLICATIONS

REFERENCE TO RELATED APPLICATIONS

This application claims the benefit and is a continuation of U.S. patent application Ser. No. 09/063,765, filed Apr. 21, 1998 (now U.S. Pat. No. 6,188,736), which claims the benefit of U.S. Provisional Application No. 60/068,613, filed Dec. 23, 1997.

BACKGROUND OF THE INVENTION

This invention relates to wireless systems and, more particularly, to systems having more than one antenna at the receiver and at the transmitter.

Physical constraints as well as narrow bandwidth, co-channel interference, adjacent channel interference, propagation loss and multi-path fading limit the capacity of cellular systems. These are severe impairments, which liken the wireless channel to a narrow pipe that impedes the flow of data. Nevertheless, interest in providing high speed wireless data services is rapidly increasing. Current cellular standards such as IS-136 can only provide data rates up to 9.6 kbps, using 30 kHz narrowband channels. In order to provide wideband services, such as multimedia, video conferencing, simultaneous voice and data, etc., it is desirable to have data rates in the range of 64–144 kbps.

Transmission schemes for multiple antenna systems may be part of a solution to the problem of the currently available low data rates. Such schemes were first proposed in papers by Wittneben, and by Seshadri and Winters, where the problem was addressed in the context of signal processing.

One prior art arrangement having a single transmitter antenna and multiple receiver antennas is shown in FIG. 1. Each of the receiver antennas receives the transmitted signal via a slightly different channel, where each channel i is characterized by transfer function $\alpha_i$. Using an approach known as "Maximum Ratio Combining", the prior art approach to detection contemplates multiplying each received signal that had been influenced by $\alpha_i$ by the complex conjugate signal, $\alpha_i^*$, summed, and then processed.

In a co-pending application titled "Method and Apparatus for Data Transmission Using Space-Time Codes and Multiple Transmit Antennas", filed on May 6, 1997, bearing the Ser. No. 08/847,635, and assigned to the assignee of this invention, a coding perspective was adopted to propose space-time coding using multiple transmit and receive antennas. Space-time coding integrates channel coding, modulation, and multiple transmit antennas to achieve higher data rates, while simultaneously providing diversity that combats fading. It may be demonstrated that adding channel coding provides significant gains over the schemes of Wittneben and Seshadri and Winters. In said co-pending application, space-time codes were designed for transmission using 2–4 transmit antennas. These codes perform extremely well in slowly varying fading environments (such as indoor transmission media). The codes have user bandwidth efficiencies of up to 4 bits/sec/Hz which are about 3–4 times the efficiency of current systems. Indeed, it can be shown that the designed codes are optimal in terms of the trade-off between diversity advantage, transmission rate, decoding complexity and constellation size.

It can also be shown that as the number of antennas is increased, the gain increases in a manner that is not unlike a multi-element antenna that is tuned to, say, a particular direction. Unfortunately, however, when maximum likelihood detection is employed at the receiver, the decoding complexity increases when the number of transmit and receive antennas is increased. It would be obviously advantageous to allow a slightly sub-optimal detection approach that substantially reduces the receiver's computation burden.

SUMMARY

Such an approach is achieved with a receiver arrangement where signals received at a plurality of antennas are each multiplied by a respective constant and then summed prior to being applied to a maximum likelihood detector. The respective constants, $\lambda_j$, where j is an index designating a particular receiver antenna, are derived from a processor that determines the largest eigenvector of the matrix A, where $\Lambda$ is a vector containing the values $\lambda_j$, and A is a matrix containing elements $\alpha_{ij}$, which is the transfer function between the $i^{th}$ transmitter antenna to the $j^{th}$ receiver antenna. The $\alpha_{ij}$ terms are determined in the receiver in conventional ways.

DETAILED DESCRIPTION

Figure 1:
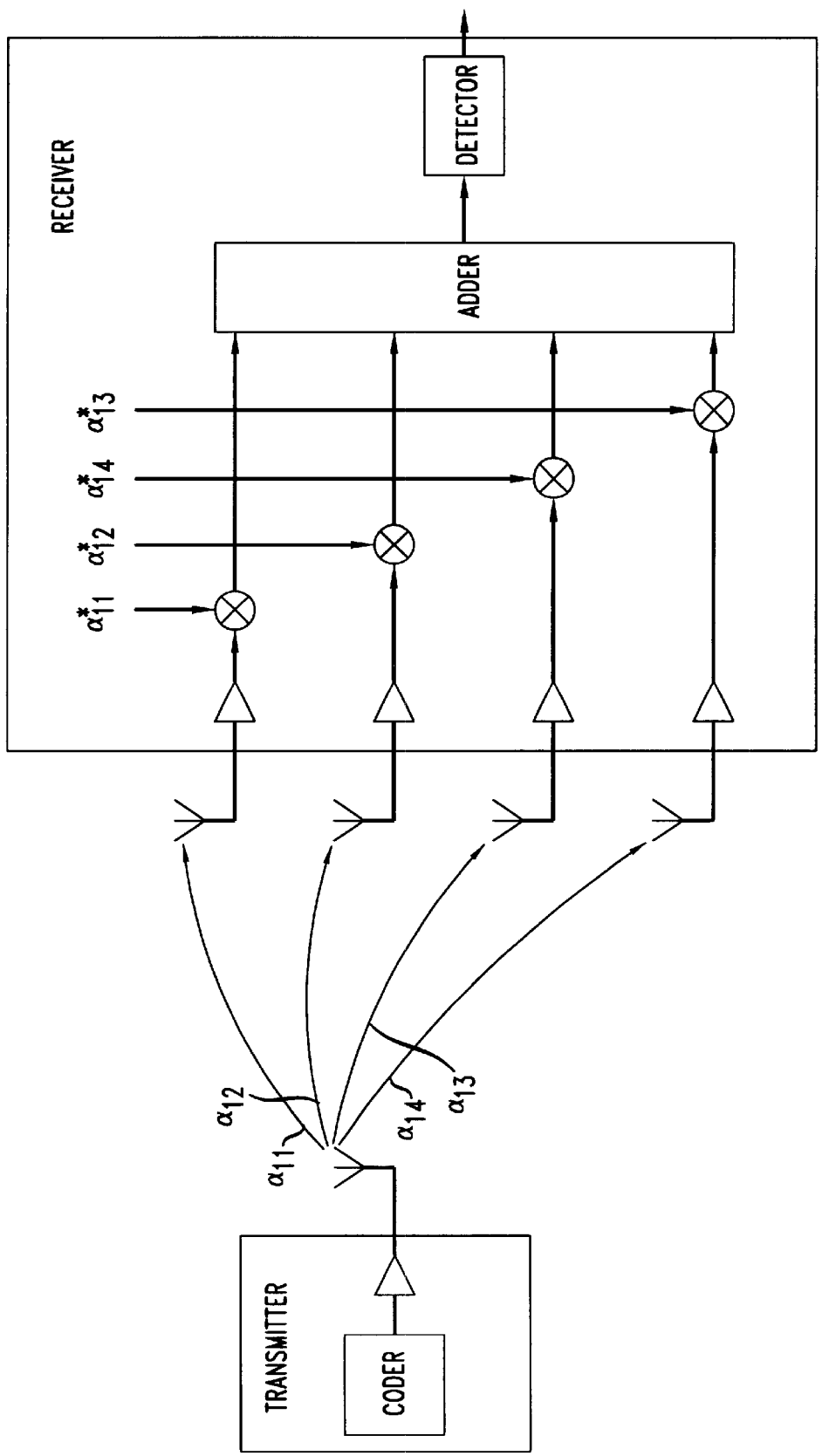
FIG. 1 presents a block diagram of prior Maximal Ratio Combining detection.
Figure 2:
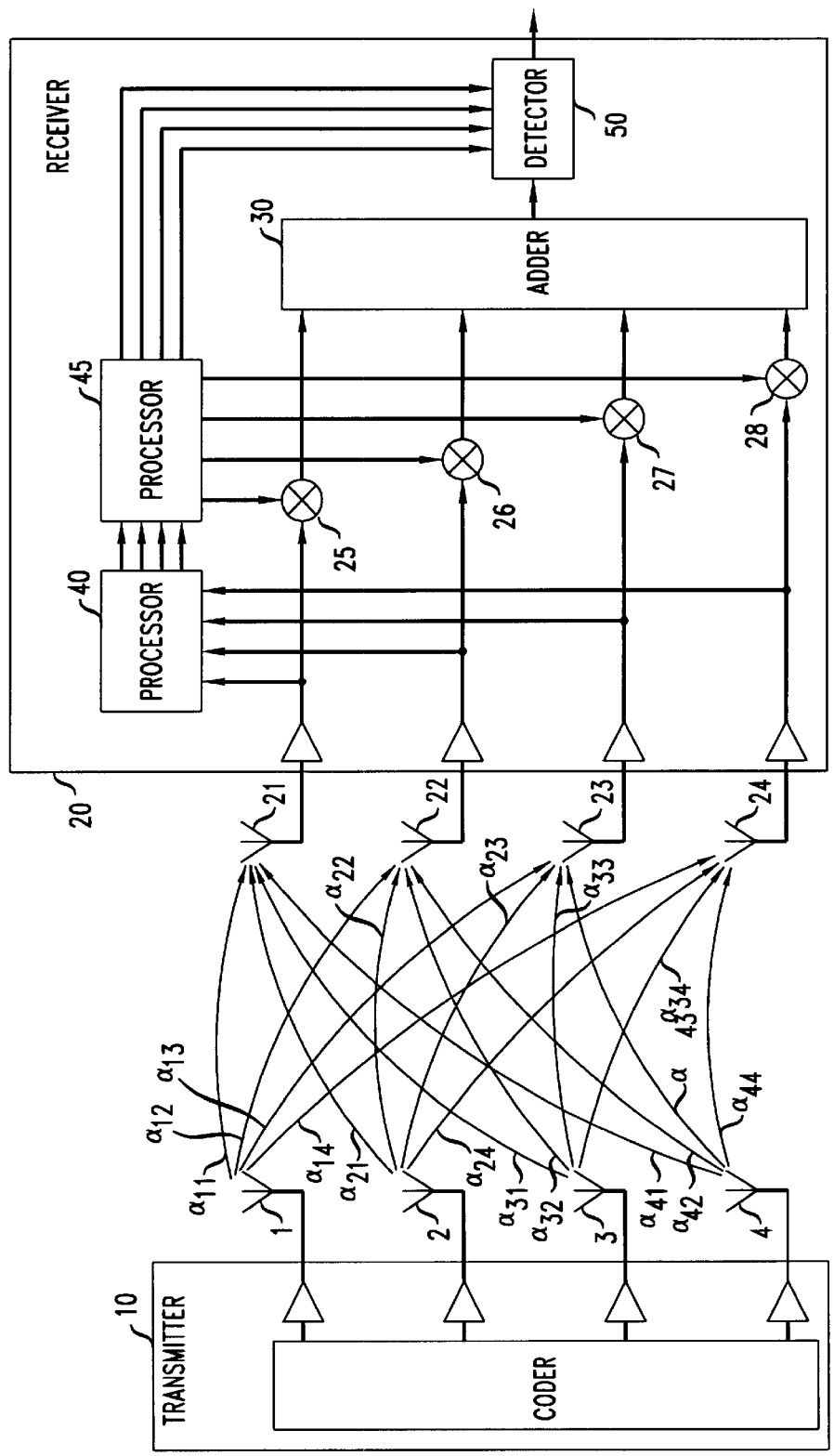
FIG. 2 presents a block diagram of an embodiment including a transmitter having a plurality of antennas, and a receiver having a plurality of antennas coupled to an efficient detection structure.

FIG. 2 presents a block diagram of a receiver in accord with an embodiment of the invention. It includes a transmitter 10 that has an n plurality of transmitting antenna 1, 2, 3, 4, and a receiver 20 that has an m plurality of receiver antennas 21, 22, 23, 24. The signals received by the receiver's antennas are multiplied in elements 25, 26, 27, and 28, and summed in adder 30. More specifically, the received signal of antenna j is multiplied by a value, $\lambda_j$, and summed. The collection of factors $\lambda_j$ can be viewed as a vector $\Lambda$. The outputs of the receiver antennas are also applied to processor 40 which, employing conventional techniques, determines the transfer functions $\alpha_{ij}$ for i=1,2,3, . . . , n and j=1,2, 3, . . . , m. These transfer functions can be evaluated, for example, through the use of training sequences that are sent by the different transmitter antennas one antenna at a time.

The evaluated $\alpha_{ij}$ signals of processor 40 are applied to processor 45 in FIG. 2 where the multiplier signals $\lambda_j$, j=1,2,3, . . . , m are computed. Processor 45 also evaluates a set of combined transfer function values $\gamma_i$, i=1,2,3, . . . , n (which are described in more detail below). Signals $\gamma_j$ of processor 45 and the output signal of adder 30 are applied to detector 50 which detects the transmitted symbols in accordance with calculations disclosed below.

It is assumed that the symbols transmitted by the antennas of transmitter 10 have been encoded in blocks of L time frames, and that fading is constant within a frame. A codeword comprises all of the symbols transmitted within a frame, and it corresponds, therefore, to $$c_1^1 c_1^2 c_1^3 \ldots c_1^4 c_2^1 c_2^2 c_2^3 \ldots c_2^4 c_3^1 c_3^2 c_3^3 \ldots c_3^4 \ldots \\ c_m^1 c_m^2 c_m^3 \ldots c_m^4, \quad (1)$$

where the superscript designates the transmitter's antennas and the subscript designates the time of transmission (or position within a frame).

From the standpoint of a single transmitting antenna, e.g., antenna 1, the signal that is received from antenna 1 in response to a transmitted symbol $c_t^1$ at time interval t is:

$$R_t = c_t^1(\alpha_{11}\lambda_1 + \alpha_{12}\lambda_2 + \alpha_{13}\lambda_3 + \ldots + \alpha_{1m}\lambda_m) \quad (2)$$

$$= c_t^1 \sum_{j=1}^{m} \lambda_j \alpha_{1j}$$

$$= c_t^1 \gamma_1$$

(when noise is ignored). If each $\lambda_j$ value is set to $\alpha^*_{1j}$, (where $\alpha^*_{1j}$ is the complex conjugate of $\alpha_{1j}$) then the received signal would simply be $$R_t = c_t^1 \sum_{j=1}^{m} |\alpha_{1j}|^2 \quad (3)$$

yielding a constructive addition.

Of course, the values of $\lambda_j$ cannot be set to match $\alpha^*_{1j}$ and concurrently to match the values of $\alpha^*_{ij}$ where $i \neq 1$; and therein lies the difficulty.

When all n of the transmitting antennas are considered, then the received signal is $$R_t = \sum_{i=1}^{n} \left( c_t^i \sum_{j=1}^{m} \lambda_j \alpha_{ij} \right) \quad (4)$$

$$= \sum_{i=1}^{n} c_t^i \gamma_i$$

In accordance with the present disclosure, the objective is to maximize $$\sum_{i=1}^{n} |\gamma_i|^2$$

because by doing so, signal $R_t$ contains as much information about $c_t^1$, i=1,2,3, ... n as is possible. However, it can be easily shown that if a matrix A is constructed such that $$A = \sum_{i=1}^{n} (\Omega_i^r)^T \Omega_i, \quad (5)$$

where $\Omega_i = (\alpha_{i1}, \alpha_{i2}, \alpha_{i3} \ldots \alpha_{im})$, then $$\sum_{i=1}^{n} |\gamma_i|^2 = \Lambda A (\Lambda^*)^T. \quad (6)$$

The receiver, thus, has to maximize $\Lambda A(\Lambda^*)^T$, subject to the constraint $\|\Lambda\|^2 = 1$. The solution to this problem is to choose $\Lambda$ to be the eigenvector of A which corresponds to the maximum eigenvalue of A. Accordingly, processor 45 develops the matrix A from the values of $\alpha_{ij}$, finds the eigenvalues of A in a conventional manner, selects the maximum eigenvalue of A, and creates the vector $\Lambda$. Once $\Lambda$ is known, processor 45 develops signals $\gamma_i$ for $1=1, 2, 3, \ldots, n$, $$\left( \text{where } \gamma_i = \sum_{j=1}^{m} \lambda_j \alpha_{ij} \right),$$

and applies them to detector 50. Finally, detector 50 minimizes the metric $$\sum_{i=1}^{L} \left| R_t - \sum_{i=1}^{n} \gamma_i c_t^i \right|^2$$

from amongst all possible codewords in a conventional manner. As can be seen, this approach reduces the complexity of decoding by almost a factor of m.

FIG. 2 depicts separate multipliers to multiply received signals by multiplication factors $\lambda_j$, and it depicts separate blocks for elements 30, 40, 45, and 50. It should be understood, however, that different embodiments are also possible. For example, it is quite conventional to incorporate all of the above-mentioned elements in a single special purpose processor, or in a single stored program controlled processor (or a small number of processors). Other modifications and improvements may also be incorporated, without departing from the spirit and scope of the invention, which is defined in the following claims.

We claim:

1. A receiver comprising:
   a plurality of receiver antennas;
   circuitry that obtains signals transmitted from a plurality of transmitter antennas; and
   a processor that
      develops a sum signal corresponding to the addition of said obtained signals that are each pre-multiplied by $\lambda_j$, where j is an index integer specifying that $\lambda_j$ multiplies the signal received from antenna j of said plurality of receiver antennas,
      develops values for transfer functions $\alpha_{ij}$, where i is associated with said transmitter antennas, and j is associated with said receiver antennas,
      develops said $\lambda_j$ factors from said transfer functions, where said $\lambda_j$ factors are components of a vector $\Lambda$, where $\Lambda$ is an eigenvector of a matrix containing said elements $\alpha_{ij}$, and
      detects symbols transmitted by said transmitter antennas embedded in said sum signal.

2. The receiver of claim 1 wherein said processor further compares said sum signal to a signal corresponding to symbols $c^i$ included in a set of symbols transmitted by transmitting antenna i of said plurality of transmitter antennas multiplied by corresponding factors $\gamma_i$.

3. The receiver of claim 2 where said corresponding factor $\gamma_i$ is related to said factors $\lambda_j$, for j=1,2, 3, . . . , m, and to $\alpha_{ij}$.

4. The receiver of claim 2 wherein said processor further minimizes a metric $$\sum_{i=1}^{L} \left| R_t - \sum_{i=1}^{n} \gamma_i c_t^i \right|^2,$$

where $R_t$ is said sum signal at time interval t within a frame having L time intervals, and $c_t^i$ is a symbol included in a set of transmitted symbols.

* * * * *